H. C. KEITH.
Bee Hive.

No. 62,425.

Patented Feb. 26, 1867.

62,425

Witnesses
F. A. Jackson

Inventor
Howard C. Keith

United States Patent Office.

HOWARD C. KEITH, OF ANCONA, ILLINOIS.

Letters Patent No. 62,425, dated February 26, 1867.

IMPROVEMENT IN BEE-HIVES.

The Schedule referred to in these Letters Patent and making part of the same.

TO ALL WHOM IT MAY CONCERN:

Be it known that I, HOWARD C. KEITH, of Ancona, in the county of Livingston, and State of Illinois, have invented a new and improved Bee-Hive; and I do hereby declare that the following is a full, clear, and exact description thereof, which will enable those skilled in the art to make and use the same, reference being had to the accompanying drawings, forming part of this specification, in which—

Figure 1:
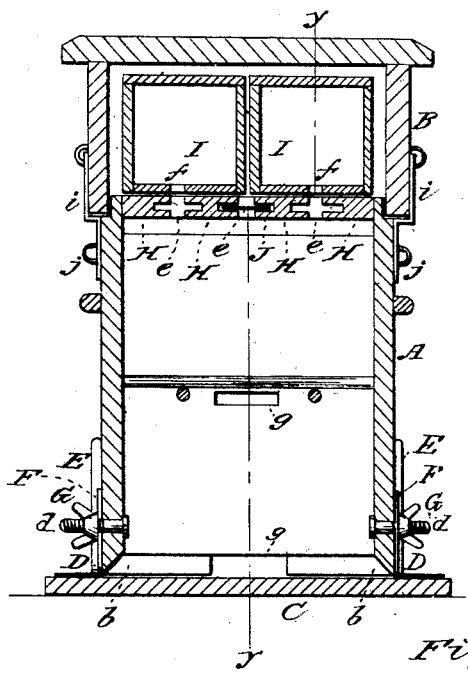
Figure 2:
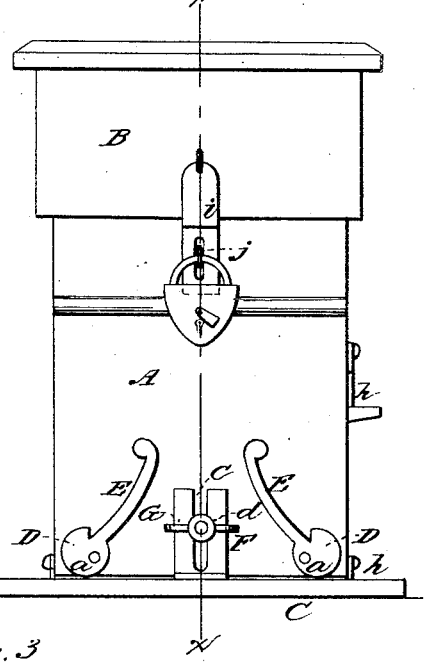

Figure 1 is a vertical central section of my invention, taken in the line $x\ x$, fig. 2.

Figure 2, an external view of the same in elevation.

Figure 3:
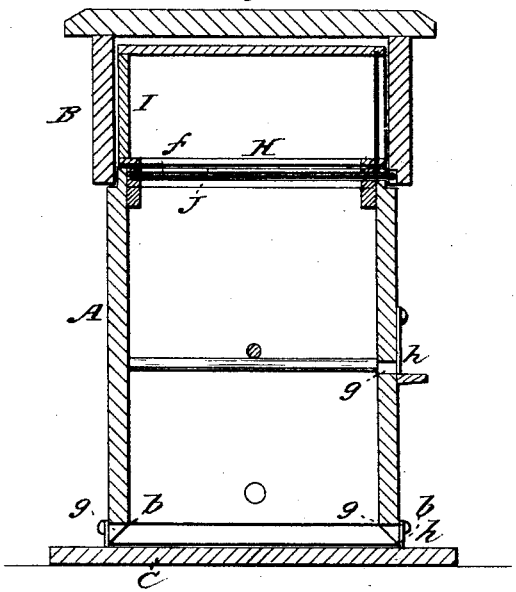

Figure 3, a vertical section of the same, taken in the line $y\ y$, fig. 1.

Similar letters of reference indicate corresponding parts.

This invention relates to certain new and useful improvements in bee-hives, as hereinafter fully shown and described, whereby the hive may be thoroughly ventilated.

A represents the body or main portion of the hive, of quadrilateral form, and any suitable dimensions, and B is a cap or top portion, the lower edge of which fits in a rebate made in the upper part of A, as shown in figs. 1 and 3. C is a bottom board, on which the body A rests, when fully down, and to two opposite sides of the body A there are attached, by pivot $a$, eccentrics D, one near each angle or corner of A, said eccentrics being provided with handles, E, by which they may be turned for the purpose of raising the body A a greater or less distance above the bottom board for ventilating purposes, or for letting it down upon the bottom board when no ventilation is required. The lower edge of the body A, at its inner side, is bevelled all around, as shown at $b$, figs. 1 and 3, so as to afford no space for the bee moth to deposit her eggs, and to the bottom board C there are attached vertical plates, F F, which are slotted vertically, as shown at $c$, to receive screws $d$, the latter projecting from A, and having thumb-nuts, G, on their outer ends. By screwing up the nuts G the bottom board may be attached to the hive, and the latter moved to any place with the bottom board secured firmly to it. This raising and lowering of the hive by means of the eccentrics does not disturb the bees in the least, as it may be done gradually and without any jars or concussions. In the upper end of the body A of the hive the honey-board is fitted, composed of a plurality of parts, H, extending entirely across the hive, with spaces, $e$, allowed between them for the bees to pass through into spare honey-boxes, I, I, which rest upon the honey-board, and have longitudinal slots, $f$, made in their bottoms for the bees to pass through. The edges of the parts H of the honey-board which adjoin each other are grooved longitudinally to receive slides, J, and as these slides are fitted about centrally between the upper and lower surfaces of the parts H, it will be seen that neither the combs in the spare honey-boxes nor in the body or main portion of the hive can be injured or cut by the adjustment of the slides. The body or main portion A of the hive is provided with bee entrances, $g$, having covers or flaps, $h$, and the cap B may be secured on A by clasps, $i$, and staples, $j$, or other suitable fastenings.

Having thus described my invention, what I claim as new, and desire to secure by Letters Patent, is—

The body A, provided with eccentrics D and screws $d$, in combination with the bottom C, and slotted plates F, for the purpose described, substantially as specified.

HOWARD C. KEITH.

Witnesses:
AMOS J. BOSSEMAN,
JOHN R. HAYS.